United States Patent [19]

Persoon et al.

[11] Patent Number: 4,736,438
[45] Date of Patent: Apr. 5, 1988

[54] IMAGE PROCESSING DEVICE FOR THE REAL-TIME PROCESSING AND RECOGNITION OF TWO-DIMENSIONAL IMAGES, AND AN IMAGE PROCESSING SYSTEM INCLUDING AT LEAST TWO SERIES-CONNECTED IMAGE PROCESSING DEVICES OF THIS KIND

[75] Inventors: Eric H. J. Persoon; Hendrikus Daalder, both of Eindhoven, Netherlands

[73] Assignee: U.S. Philips Corporation, New York, N.Y.

[21] Appl. No.: 819,572

[22] Filed: Jan. 17, 1986

[30] Foreign Application Priority Data

Jan. 23, 1985 [NL] Netherlands ............. 8500172

[51] Int. Cl.$^4$ ............................................. G06K 9/68
[52] U.S. Cl. ................................................. 382/34
[58] Field of Search ............... 358/138; 364/728; 382/10, 22, 30, 32–34, 42, 47–49, 54–56

[56] References Cited

U.S. PATENT DOCUMENTS 4,200,861  4/1980  Hubach et al. ............... 382/34
4,521,909  6/1985  Wang .............................. 382/34
4,651,341  3/1987  Nakashima et al. ........... 382/34

FOREIGN PATENT DOCUMENTS

1399348  7/1975  United Kingdom .

Primary Examiner—Leo H. Boudreau
Assistant Examiner—Jose L. Couso
Attorney, Agent, or Firm—Thomas A. Briody; Jack E. Haken; Anne E. Barschall

[57] ABSTRACT

An image processing device for two-dimensional raster images is described. The receiving means thereof are followed by a sub-sampling circuit (28) for increasing the pitch of the raster received in accordance with an adjustable scale. To the sub-sampling circuit there are connected a buffer (30, 32) and a correlation circuit (36, 38) for comparing a number of columns of pixels with a reference image. The comparison result is subjected to a logic operation. The device is suitable for modular use and may include a growth circuit for converting rasters portions onto one color or brightness when a predetermined minimum number of pixels therein contains the relevant color or brightness, respectively.

14 Claims, 5 Drawing Sheets

IMAGE PROCESSING DEVICE FOR THE REAL-TIME PROCESSING AND RECOGNITION OF TWO-DIMENSIONAL IMAGES, AND AN IMAGE PROCESSING SYSTEM INCLUDING AT LEAST TWO SERIES-CONNECTED IMAGE PROCESSING DEVICES OF THIS KIND

BACKGROUND OF THE INVENTION

1. Field of the Invention

The invention relates to an image processing device for the real-time processing and recognition of an image consisting of a two-dimensional array of digitized pixels, said device including:

a. receiving means for receiving the pixels in order to form therefrom a first bit stream in which each bit represents a pizel;

b. a sub-sampling circuit which includes a control input for forming a second bit stream from the first bit stream, under the control of a pitch-increasing control signal on the control input, and for selectively increasing the pitch of a secondary raster period thereof with respect to a raster of pixels received;

c. a buffer which is line-wise fed by the sub-sampling circuit in order to effect temporary storage of the second bit stream and to present the information of a column of pixels in parallel on an output;

d. a correlation circuit which is fed by the buffer in order to compare the pixels of a number of successively received columns with corresponding reference pixels, a masking circuit indicating each pixel-wise comparison as being relevant/irrelevant;

e. clock means for controlling the sub-sampling circuit, the buffer, the correlation circuit and the selection/processing circuit in mutual synchronism and for controlling the receiving means isochronously with respect thereto.

2. Prior Art

Such a device is known from U.S. Pat. No. 4,200,861. The known device first performs a coarse-pitched sampling operation in order to determine the position of a desired part of the image. Subsequently, a fine-pitched sampling operation is performed in order to safeguard the position/presence of this part of the image. The known device involves two steps, so that it does not operate on a real-time basis.

SUMMARY OF THE INVENTION

It is an object of the invention to provide a real-time image processing device so that much faster recognition can be achieved which is a very positive aspect, for example, for robotics. Moreover, by using a selective pitch-increasing operation and pixel-wise indication of whether a correlation is relevant/irrelevant a great protection against scale enlargement errors and angle adjustment errors can be obtained, the set-up being such that the device does not become overly complex. The device can also be used as a module in a composite image processing system.

This object is achieved in accordance with the invention in that the sub-sampling circuit is adapted to adjust the secondary raster period to different values between 1 and a maximum pitch-increasing factor, A selection/processing circuit is connected to the output of the correlation circuit for selectively presenting respective categories of comparison results on a recognition output,. The recognition output is suitable for the connection of a further image processing device of this kind as well as for the supply of comparison results to a user device.

The sub-sampling circuit is capable of realizing an electronic, adjustable reduction (zoom-out) of the image, without it being necessary to load a new reference image.

Thus, the recognition capability is enhanced and /or the operation becomes more flexible vis-à-vis scale deviations. The buffer is capable of defining a window. The correlation circuit is capable of recognizing an image each time a new column is presented, the reference as well as the relevance per pixel being adjustable. The selection/processing means are capable of performing a variety of logic and arithmetic operations on the comparison results. As is known, two periodic phenomena are mutually isochronous when a significant, recurrent portion of one periodic phenomenon invariably occurs in one or a few fixed locations in the period of the other phenomenon. Because a plurality of image processing devices can be connected in series or in parallel, recognitions can first be performed with a wide margin (wide in a geometrical as well as logic sense), followed by a "fine" recognition, for example on the basis of the primary recognitions as will be described hereinafter.

Preferably, a growth circuit is connected between the receiving means and the sub-sampling circuit in order to impart the relevant first binary value to all pixels in the case of a raster portion comprising nxm binary pixels of which at least a predetermined number j have a first binary value. As a result of the combined effect of the sub-sampling circuit and the growth circuit, given significant details in the image can be saved in spite of the reduction. Growth can take place before as well as after sub-sampling. In given versions growth and sub-sampling will be realized in a single circuit.

The image processing device can be used as module in a higher-order image processing system; a variety of logic functions (AND, OR,NAND) can then also be formed from the processing results.

Further attractive aspects of the invention will become apparent from the dependent Claims. The invention also relates to an image processing system including at least two series-connected image processing devices of the described kind.

BRIEF DESCRIPTION OF THE DRAWINGS

The invention will be described in detail hereinafter with reference to some Figures.

DETAILED DESCRIPTION OF THE PREFERRED EMBODIMENT

Figure 1:
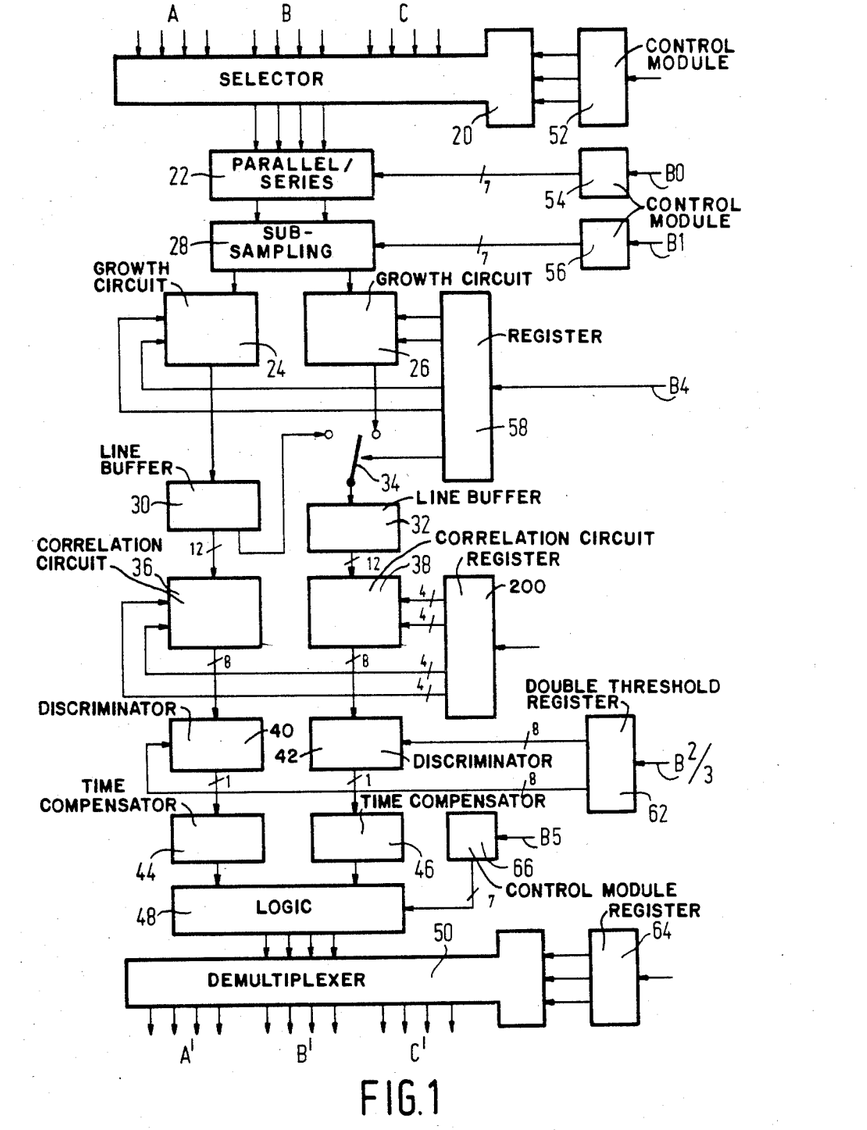
FIG. 1 shows a block diagram of a preferred embodiment of the device.

FIG. 1 shows a block diagram of a preferred embodiment for the real-time recognition of two-dimensionally organized images. The input information can be received on three separate input busses A, B, C, each of which has a data path width of four bits. When the information is organized in 8-bit bytes, successive half bytes (tetrades) are received in multiplex form. Each pixel is then represented by a single bit, so that a fully binarized image is received. In given cases the information received per pixel may consist of a larger number of bits. A possibly necessary discriminator has been omitted for the sake of simplicity. The analog/digital conversion which may also be necessary has also not been considered. The image information is organized in the form of image lines, so that every four bits of a tetrade invariably concern four pixels on the same line. The next tetrade then concerns the next four pixels until the complete line has been dealt with and the processing of the next line commences. Similarly, the image information may be received columnwise. In any case, the image is organized in rows and columns of pixels. Element 20 is a selector which is connected to the three busses A, B, C in order to select one bus therefrom. This element also includes a module output having a width of four bits. Control module 52 supplies a control signal for the selection. As is shown the module 52 includes an input for an externally receivable control signal. The module 52 can thus act as a decoder. Element 22 is a parallel/series converter cum multiplexer. This element includes an input having a width of four bits as well as two parallel outputs. Control module 54 supplies an external control signal BO having a width of 7 bits. The element 22 serves for the correct presentation of the information to the element 28. The two outputs of the element 28 can supply the same information. It is alternatively possible to activate one of the two outputs as desired.

Element 28 is a sub-sampling circuit and forms, if necessary, a raster with an increased pitch by subjecting the pixel information received per image line to a selection operation. This will be described in detail with reference to FIGS. 2a–2d. Furthermore, the element 22 selects pixels line by line for conduction according to a similar pattern as used by the element 28 within an image line. The element 28, therefore, is controlled in the same manner as the element 22. Actually, these two elements together form the sub-sampling circuit which is controlled inter alia by the pitch-increasing control signal from the modules 54, 56. As in indicated, double operation of the elements 22, 28 is possible, for example, in that the information tetrades from the selector 20 originate alternately from different images, the further processing being performed separately for each image. Another possibility consists in that the same information is selected twice; of the same image, alternatively, only a single second bit stream can be conducted on one output. The elements 24, 26 are growth circuits which receive control signals from a module 58. These growth circuits are capable of converting one pixel of one colour into a group of pixels of one colour, for example a group of 2×2, 2×1, 1×2 or 1×1 pixels (consequently, in the latter case there is no growth). In the present example this holds good only for the white pixels, so that two control bits suffice. The total number of pixels remains the same, so that upon conversion into a white pixel the colour of the pixel present in the relevant location changes. Alternatively it may be that a group of 2×2 pixels is converted into white pixels only if initially there are at least two white pixels included therein. Other limits are also feasible. When a pixel forms part of two groups which both satisfy the criterion for converting the relevant pixel to white, it also becomes white. This growth operation usually renders image edges smoother and/or easier to recognize. Thus, the elements 24, 26 have, for example, an internal feedback which memorizes the information of those pixels which have to be made "white" in the next image line, regardless of the information arriving for said next image line. Another solution consists in that the input information is presented to a logic circuit. In that case the output pixels appear on the output of this logic circuit, so for example 2×2 pixels. These output pixels are invariably presented once (during the next image line) on the output of this circuit again, the OR-function being formed from the new values and the already present values when "white" is "logic 1". The module 58 is a register which is activated by bit B4, for example for receiving a control word from a source (not shown). "White" and "black" can be interchanged in the foregoing description. A further modification of the foregoing could consist in that a growth circuit is connected between the selector 20 and the sub-sampling circuit. Notably in the latter case it has been found that narrow significant details in the original image are saved in the reduced image, because the significant details can achieve greater importance due to the growth circuit. However, the sequence shown in the Figure is also useful.

The elements 30, 32 are line buffers which have a capacity of 12 image lines each and which are constructed as shift registers having branch outputs in several bit locations throughout the shift register. They are line-wise fed, one image line after the other. Thus, on the output of each line buffer invariably the information is available of, for example, twelve pixels which are arranged column-wise one over the other. A final pixel information is applied from the line buffer 30 to a switch 34. When this switch is in its left-hand position, the line buffers 30, 32 are connected in series. Consequently, the information of twice as many pixels, so in this case 24 pixels arranged one above the other, becomes available on the outputs of these two line buffers. As result, a twice as large portion of the image can be subjected to a recognition operation. When the switch 34 is in its right-hand position, the two halves of the circuit operate independently. The multiplicity of the remainder of the circuit can be increased in a similar manner for subjecting a given image to two different correlations in parallel.

The elements 36, 38 are correlation circuits. Actually, each of these circuits is a two-dimensional shift register for 12×12 pixels. The window formed on the image by these shift registers is thus shifted through the image according to successive image lines. Per bit position of this window there are present a data bit (received from the elements 30/32), a reference bit, and a masking bit, in total 144 data bits and 2×144 further bits per correlation circuit. Only the data bits are shifted. The reference bits are loaded from a register 200, via connections having a width of 4 bits. The specific load control for moving the appropriate reference bits and masking bits to the appropriate positions in the shift registers has been omitted for the sake of simplicity, but loading can be easily performed by presenting the reference image or the relevance pattern via the element 20 and by providing a relevant load signal in the correlation circuit. The loading of a reference pattern itself is known from the cited prior art. Thus, per pixel there is provided a logic circuit. This circuit outputs, for example, a "1" when the pixel and the reference element correspond and the masking bit indicates that the comparison is relevant, but otherwise it outputs a "0". A first value of the reference bit then indicates black while a second value indicates white. A first value of the masking bit then indicates that the result of the bit-wise comparison is relevant, while a second value of the masking bit indicates that the result of the comparison is irrelevant.

The correlation circuits 36, 38 furthermore comprise summing devices for the correlation results. Each pixel information which corresponds to the reference pixel value and for which the masking bit indicates that the comparison result is relevant, increments the correlation result by 1. The total correlation result, therefore, is between 0 and 144. The summing device may be constructed as an adder, which interrogates the 144 bit positions. The correlation result is output as a sequence of 8-bit informations. Elements 40, 42 are discriminators They receive 8-bit threshold values from a double threshold register 62 which is capable of receiving two external control bits B2, B3. The threshold register is constructed as a serial-in/parallel-out register. Each of the discriminators outputs a 1-bit result signal, depending on whether the correlation result is larger than the threshold value or not. Other logic functions (larger than or equal to, etc.) can also be implemented.

Elements 44 and 46 are time compensators. Time compensation may be required when the two comparisons should produce a positive result at different instants. This may make sense, for example when the comparison of two image regions which are situated at a given distance from one another must produce a given comparison result together, when each of them is compared with a given reference image. The distance is translated into a given delay (in pixels and/or image lines). An example thereof will be described in detail hereinafter. A logic circuit 48 is capable of performing logic operations on the comparison results, for example a logic AND-operation; thus, one image can be simultaneously correlated with two different reference images. It is alternatively possible to correlate two different images simultaneously with two reference images. Other logic operations may be an OR-operation, EX-CLUSIVE-OR operation, and the like. The logic circuit 48 can be controlled by a 7-bit signal from the control module 66. The module 66 is again organized as a serial-in/parallel-out control register. When the two bits of the comparisons are A and B, $2^4$ possible combinations exist. Element 48 in this case applies output signals to a demultiplexer 50. This demultiplexer is connected to the three output busses A', B', C'. The demultiplexer 50 is controlled by a register 64.

The entire device as shown is controlled by a clock circuit: the pixels arrive on the input busses, for example in synchronism with the scanning of an image by a light spot scanner, or in synchronism with the interrogation of a camera comprising an array (one- or two-dimensional) of photosensitive elements. At the exit side of the subsampling circuit adaptation takes place so that the supply and output of information are isochronous as regards the sub-sampling circuit. At the level of the complete image, a further image buffer may be provided at the output of the device, or there may be provided a buffer for the temporary storage of only the (ultimate) recognition results. In the case of continuous data streams, the control at the input and the output of a processing element must always be in synchronism. It is only in the case of a processing element in which the bit rates on the input and the output deviate from one another (as in the subsampling circuit) that the control must be isochronous; the clock frequencies then relate as real fractions (for example 1:1, 2:3 and the like).

The sub-sampling circuit

Figure 2A:
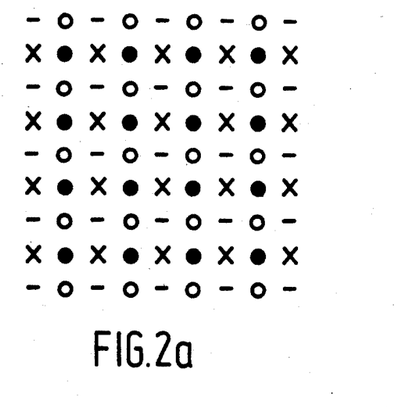
FIGS. 2a–2d illustrate the sub-sampling circuit.
Figure 2B:
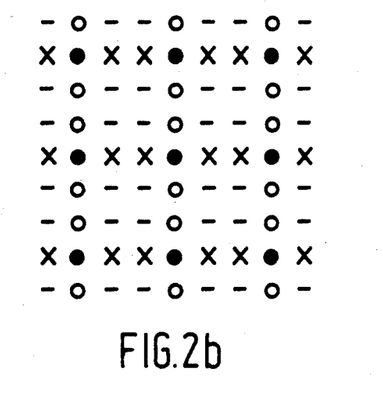
Figure 2C:
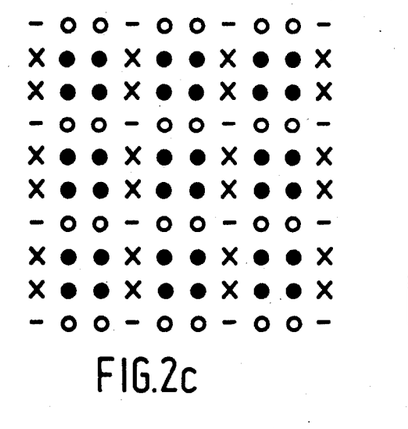

The growth circuit itself is known from GB Pat. No. 1,399,348 (PHB 32.178). The operation of the subsampling circuit will be illustrated with reference to the FIGS. 2a–2d. FIGS. 2a–2c show some forms of increased pitch. The following possibilities exist:

(a) all pixels are conducted:

(b) every second pixel is conducted, the other pixels being blocked. This is shown in FIG. 2a: on the even lines the pixels denoted by dots are conducted and the pixels denoted by crosses are blocked. In the even columns the pixels denoted by circles are blocked. The pixels denoted by dashes are blocked because they are situated in rows to be blocked as well as in columns to be blocked.

(c) alternately two pixels are blocked and one pixel is conducted. This is shown in FIG. 2b.

(d) every third pixel is blocked. This is shown in FIG. 2c.

(e) alternately two pixels are conducted, one pixel is blocked, one pixel is conducted, one pixel is blocked.

A large number of further possibilities exist. The pitch increasing factor need not necessarily be the same in both directions.

An extension in the other sense could consist in the conversion of the information of a group of pixels into information of a secondary group is pixels. For example, when a group of 3×3 pixels is to be converted into a group of 2×2 pixels, the information of the latter is formed on the basis of the information of the first group, for example by way of an interpolation formula, which is subsequently converted into a bivalent quantity again per pixel. Such procedures will not be elaborated upon herein.

Figure 2D:
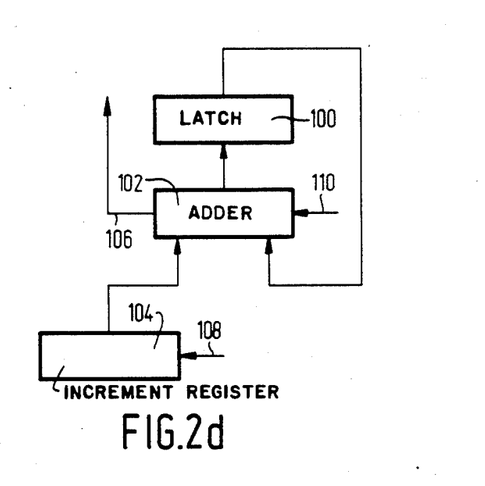

FIG. 2d shows a circuit for realizing the pitchincreasing selection shown in FIGS. 2a–2c. Element 102 is an adder, element 100 is a latch register. Element 104 is an increment register. For each pixel on a line the increment of the register 104 is added to the information fed back from the register 100. A carry signal appears on line 106. When this signal has the value "1", the pixel must be conducted; otherwise it is not conducted. The pattern of FIG. 2a is obtained when the element 102 has a width of four bits and the register 104 contains the information HEX8. When this information is smaller, a smaller number of pixels is conducted. When this information is larger, more pixels are conducted. The patterns of FIGS. 2b, 2c can only be approximated when exclusively binary means are used. Such an approximation is obtained for FIG. 2b when use is made of a binary adder having a width of 8 bits and the register 104 contains the information 01001011=HEX 4A. FIG. 2c is approximated when the register 104 contains HEX A5. Similarly, other pitch increasing factors can also be implemented. Using such a circuit it is also possible to determine which lines must be completely blocked and on which lines pixels are selectively conducted/blocked.

Applications:

FIGS. 3a–3e illustrate operations by means of an image processing device or an image processing system composed of a plurality of series-connected image processing devices.

Figure 3A:
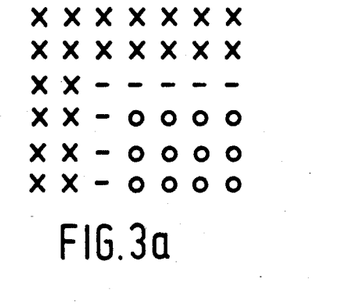
FIGS. 3a–3n illustrate operations performed by means of an image processing device and an image processing system composed of a plurality of series-connected image processing devices.

FIGS. 3a–3e show some appropriate reference patterns. A cross denotes a reference pixel having a first value, for example, black. A zero means a reference pixel having a second value, for example white. A minus sign denotes a masking pixel which indicates that the comparison result is irrelevant. FIG. 3a shows a reference/masking pattern for a right angle in a black/white image. The irrelevance of the pixels along the edge introduces a tolerance. This tolerance may be a tolerance as regards translation, a tolerance as regards rotation, and a tolerance as regards the magnitude of the angle. Furthermore, there is a tolerance as regards the effects of noise on the edge.

Figure 3B:
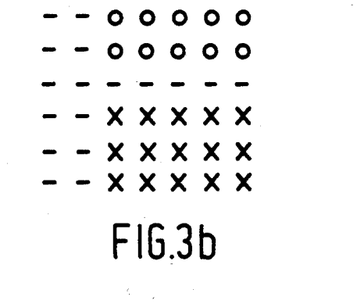

FIG. 3b shows a reference/masking pattern for a horizontal edge. Therein, the entire left-hand edge of the Figure is irrelevant for the comparison. Similarly, other reference/masking patterns may be formed. The width of a band of irrelevance pixels is determined in relation to the expected tolerances. For given reference patterns the number of black pixels deviates substantially from the number of white pixels, for example when a small white pattern (letter) is to be recognized in a large black environment. This gives rise to problems as regards the correct choice of the discrimination threshold in relation to the number of irrelevance pixels. In such a case the configuration of the black pixels is recognized in one circuit, for example 36, and the configuration of the white pixels is recognized in the other circuit, for example, 38. The double construction of FIG. 1 is thus attractive.

Figure 3C:
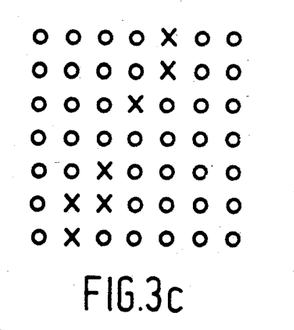
Figure 3D:
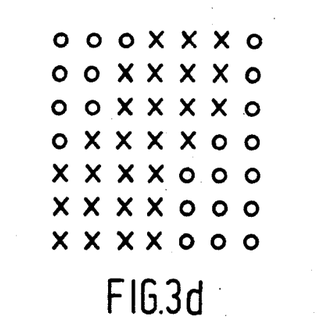

FIGS. 3c, 3d provide more concise information as regards the operation of a growth circuit. FIG. 3c shows a thin line through the image which is interrupted in one location. Each pixel is considered to be the centre of a square comprising 3×3 pixels. When the central pixel is black, the growth circuit ensures that the entire square comprising 3×3 pixels becomes black. The result is shown in FIG. 3d.

Figure 3E:
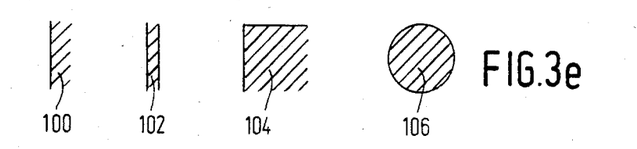

FIG. 3e shows examples of image portions which can be recognized by means of a single correlation circuit, that is to say in succession an edge 100, a line 102, a corner 104, and a hole 106. The sub-sampling circuit is attractive notably for a hole because large as well as small holes can be recognized.

Figure 3F:
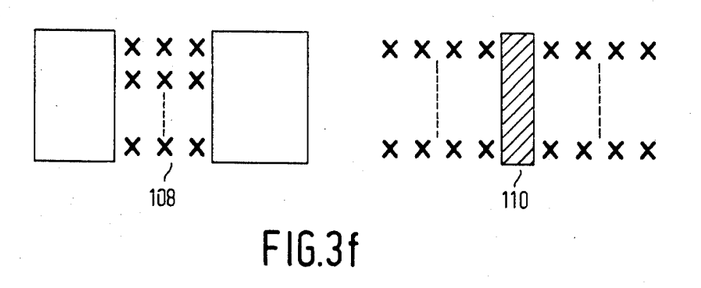

FIG. 3f shows an example of the recognition of a line by means of two parallel-connected correlation circuits; the results are combined in an AND-circuit. This set-up is required notably when the ratio of the number of black pixels and the number of white pixels deviates substantially from 1:1. The mask 108 determines the white pixels and the mask 110 determines the black pixels. In this case, a cross denotes "irrelevant". In given circumstances three or more correlation circuits can be combined in one logic function.

Figure 3G:
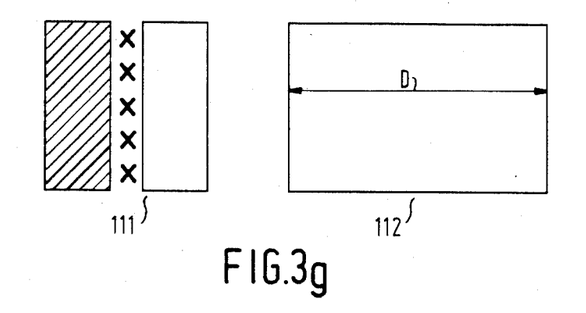

FIG. 3g shows an example of the verification of whether a sufficient amount of white (example 114) area is present or the right side of a black/white transition (detection with example 112). In this case the length D must be chosen to be equal to the required minimum width of the white portion. This image can be more accurately detected by means of two separate correlations.

More complex shapes involving little rotation.
 (2 reference images):

When an object has a reasonably stable orientation, it may be useful to define larger reference images because they can be more unique. This is done as follows: the line buffer input of reference B is coupled to the line buffer output of reference A and the outputs of the two correlation circuits are combined in an AND-function. A larger image field can thus becovered.

Introducing a larger tolerance as regards the recognition of a shape: in that case a tolerance as regards size and/or rotation must be considered.

in the case of a tolerance as regards size it may be advantageous to use a plurality of references having the same shape but a different enlargement.

Figure 3H:
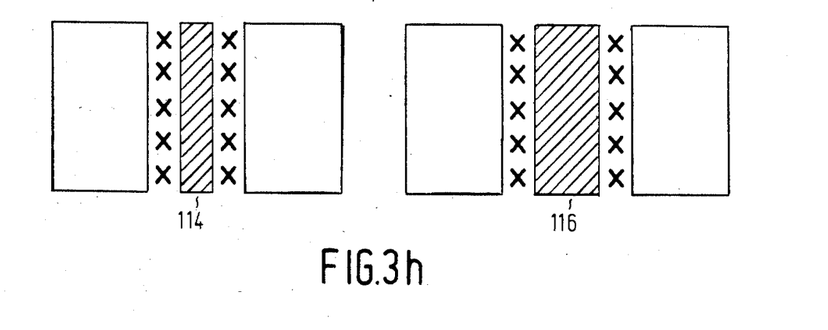

This is used inter alia for line detection and is programmed as shown in FIG. 3h. The outputs of the correlation circuits (according to reference image 114 or 116) must then be combined in an OR-function (thin line and heavy line, respectively).

In the case of a tolerance as regards angle, several references can be used at different angles; it will again be necessary to form an OR-function.

Hereinafter a description will be given of recognition by means of two (or more) series-connected recognition devices. For example, in a first recognition device two edges are recognized in accordance with FIG. 3i, 118, 120. The recognition patterns are combined in a second recognition device in order to recognize the corner denoted by the reference 122. This principle can also be used for the recognition of parallel lines and T-crossings in the second recognition device. Due to the use of two series-connected devices, the susceptibility to interference is lower than in the case of direct recognition in a single recognition device.

Figure 3I:
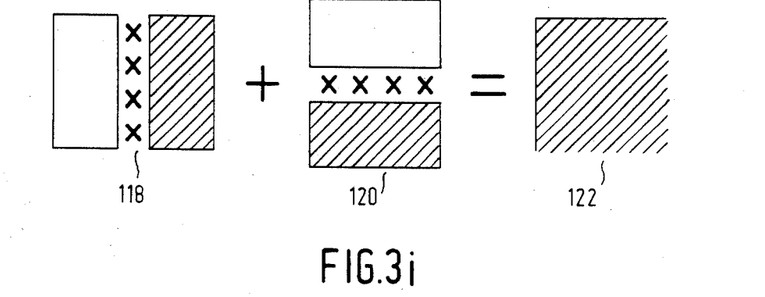
Figure 3J:
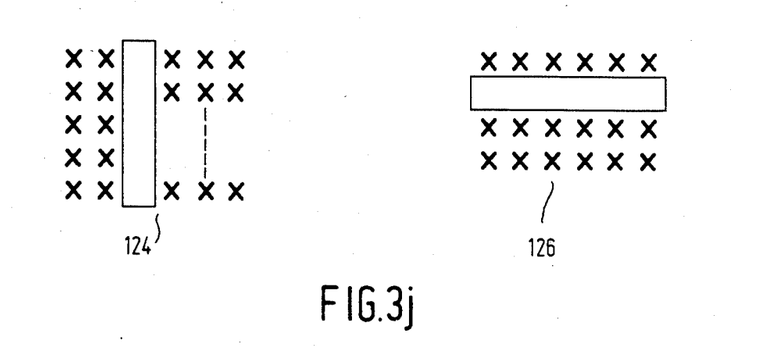

In this respect FIG. 3j shows the reference images for the second recognition device, the reference image 124 being used for processing the recognition results of the reference image 118 of FIG. 3i and the reference image 126 for the processing of the results of the reference image 120. Notably the use of the growth circuit and/or the pitch increasing operation is particularly attractive in such an application.

Figure 3K:
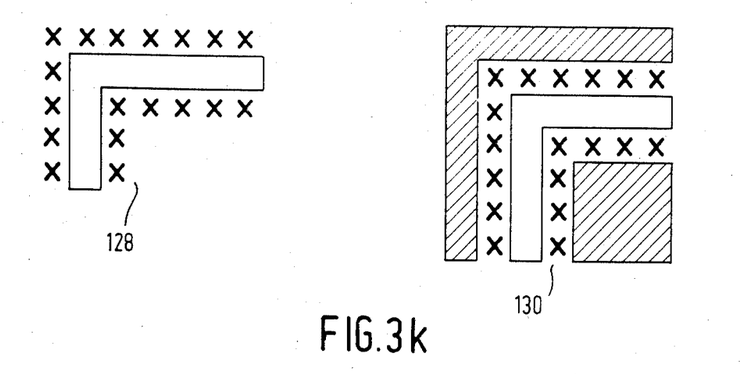

A further solution consists in performing the recognition in the second recognition device by means of the reference images of FIG. 3k: 128, 130. The dark portions in the image 130 are used to ensure that no recognition occurs at these areas.

Corners, parallel lines and extremities of lines can thus be readily recognized.

Given shapes can actually be suitably recognized only in a second recognition device and not in a first recognition device, for example a right angle between two edges, an arc of a circle, etc.

In extreme cases very complex objects can be recognized. Another example of the use of series-connected recognition devices is the enhancement of the reliability. In the case of a poor S/N ratio, reliable recognition of a thin line is hardly possible when only one recognition device is used. A second recognition device actually considers a larger area and is capable of:

1. filling up voids in recognitions of the first recognition device.

Figure 3L:
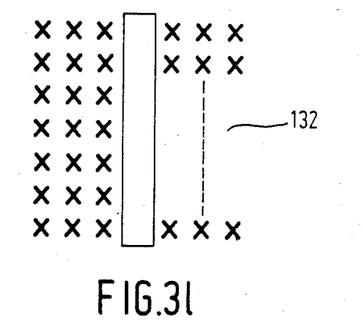

2. eliminating small pieces of incidental recognitions by the first recognition device. FIG. 3l (132) shows the mask used in the second recognition device for a vertical thin line.

Figure 3M:
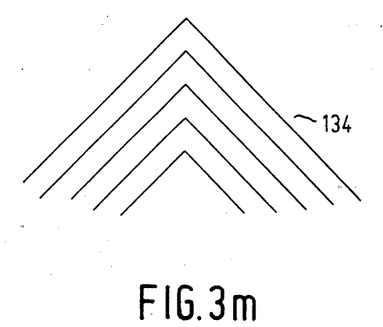

Detection of texture edges:

Sometimes edges between two regions (object/background) can not be found merely on the basis of intensity differences. An edge may be formed by texture differences. FIG. 3m shows an example in this respect.

Figure 3N:
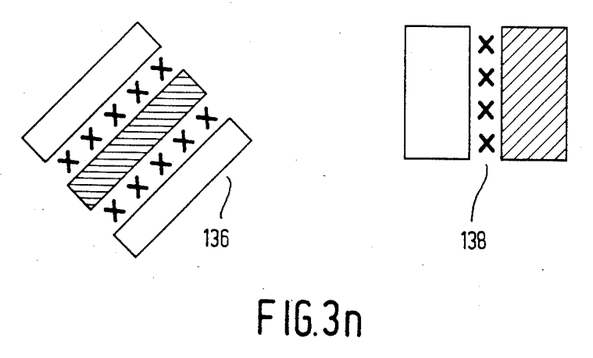

A vertical edge is clearly visible therein. This edge is recognized in two steps. In a first recognition device, a thin line is programmed as a reference image; FIG. 3n: 136. This will produce a large number of recognitions in the left-hand portion and few recognitions in the right-hand portion. In a second, series-connected recognition device the transition mask of FIG. 3n (138) is programmed. This will indicate a "recognition" at the area of the boundary line in FIG. 3m.

Real-time inspection:

A typical problem occurs during real-time inspection, that is to say when the shape to be recognized is not unique in the image. An example in this respect is formed by an object having four (identical) holes when it is necessary to determine the position of one of these holes, for example the extreme left hole. During a first recognition step, the four holes are separately determined, i.e. using each time a reference image for one hole. After that a more complex operation can be performed involving pitch increasing and growth, while during a next recognition step a reference image can be used for all four holes together.

What is claimed is:

1. An image processing device for the real-time processing and recognition of an image consisting of a two-dimensional array of digitized pixels, said device including:
   (a) receiving means (20, 22) for receiving the pixels in order to form therefrom a first bit stream in which each bit represents a fine-grained pixel;
   (b) a sub-sampling circuit, which includes a control input, for forming a second bit stream having a secondary raster period and in which each bit represents a coarse-grained pixel, from the first bit stream;
   (c) a buffer which is line-wise fed by the sub-sampling circuit in order to effect temporary storage of the second bit stream and to present the information from a column of pixels in parallel on an output;
   (d) a correlation circuit which is fed by the buffer in order to compare the pixels of a number of successively received columns with corresponding reference pixels from a reference image,
   (e) a masking circuit indicating each pixel-wise comparison as being relevant/irrelevant;
   (f) clock means for controlling the sub-sampling circuit, the buffer, and the correlation circuit in mutual synchronism and for controlling the receiving means isochronously with respect thereto, wherein the improvement comprises:
   (g) the sub-sampling circuit includes a control input, the sub-sampling circuit selectably adjusting the secondary raster period to different values between 1 and a maximum pitch-increasing factor, under the control of a pitch-increasing control signal, and
   (h) a selection/processing circuit is connected to the output of the correlation circuit for selectively presenting respective categories of comparison results at a recognition output, under control of the clock means in synchronism with the sub-sampling circuit, the buffer and the correlation circuit, which recognition output is suitable for the connection of a further image processing device of this kind as well as for the supply of comparison results to a user device.

2. An image processing device as claimed in claim 1, characterized in that the information of one secondary raster point is derived from a primary raster point in that there are provided an accumulator register and an increment register, the selection of a primary raster row or raster column being activated by a carry output signal of the accumulator registor which can be incremented by way of the increment register.

3. An image processing device as claimed in claim 1, characterized in that there is provided an input for the connection of an output of a further image processing device of this kind.

4. An image processing device for real-time processing and recognition of an image consisting of a two-dimensional array of digitized pixels, said device comprising:
   a. means for receiving the image in order to form therefrom a first bit stream in which each bit represents a fine-grained pixel;
   b. a sub-sampling circuit for forming a second bit stream from the first bit stream, the second bit stream having a secondary raster period, each bit of the second bit stream representing a coarse-grained pixel, the sub-sampling circuit having a control input coupled to receive a pitch-increasing control signal, the sub-sampling circuit selectably adjusting the secondary raster period to different values between 1 and a maximum pitch-increasing factor;
   c. a buffer for temporarily storing the second bit stream, the buffer being fed line-wise by the sub-sampling circuit and having an output at which a column of pixels is provided in parallel;
   d. a correlation circuit coupled to the output of the buffer for comparing successively received columns of pixels with corresponding reference pixels from a reference image;
   e. a masking circuit for indicating whether each pixel-wise comparison made by the correlation circuit is relevant;
   f. a selection/processing circuit, coupled to the output of the correlation circuit, for selectively presenting respective categories of comparison results at a recognition output, which recognition output is suitable for the connection of a further image processing device as well as for supplying comparison results to a user device; and
   g. clock means for synchronously controlling the sub-sampling circuit, the buffer, the correlation circuit, and the selection/processing circuit and for controlling the receiving means isochronously with respect thereto.

5. The image processing device of claim 4:
   a. further comprising:
      i. an accumulator register having a carry output at which a carry output signal is provided; and
      ii. an increment register for incrementing the accumulator register by a fixed increment each time a fine-grained pixel is received; and
   b. wherein the sub-sampling circuit derives the information in the coarse-grained pixels from information in the fine-grained pixels by selecting one of a primary raster row or primary raster column based on the carry output signal.

6. The image processing device of claim 5 wherein:
   a. the buffer and correlation circuits are at least double-operating, in order to compare the image with at least two reference images simultaneously; and
   b. the selection/processing circuit includes logic means for combining plural output signals of the correlation circuit.

7. The image processing device of claim 6 wherein the buffer comprises first and second buffers, an output of the first buffer being selectably connectable to an input of the second buffer for processing the image in an enlarged format in a single recognition/processing step.

8. The image processing device of claim 4 wherein:
a. the buffer and correlation circuits are at least double-operating, in order to compare the image with at least two reference images simultaneously; and
b. the selection/processing circuit includes logic means for combining plural output signals of the correlation circuit.

9. The image processing device of claim 3 wherein:
a. the device is for recognizing at least two images;
b. the buffer and correlation circuits are at least double-operating, in order to compare the two images received with the reference image; and
c. the selection/processing circuit includes logic means for combining plural output signals of the correlation circuit.

10. The image processing device of claim 9 wherein:
a. the buffer and correlation circuits compare the two images with two respective reference images simultaneously; and
b. the selection/processing circuit includes logic means for combining plural output signals of the correlation circuit.

11. The image processing device of claim 4 wherein the buffer comprises first and second buffers, the first buffer being selectably connectable to an input of the second buffer for processing the image in an enlarged format in a single recognition/processing step.

12. An image processing device as claimed in claim 1, 4, 5, 7, or 8, characterized in that a growth circuit is connected between the receiving means and the sub-sampling circuit in order to impart a relevant first binary value to all pixels in the case of a raster portion comprising nxm binary pixels of which at least a predetermined number j has a first binary value.

13. An image processing device as claimed in claim 1, 4, 5, 7, or 8, characterized in that a growth circuit is connected between the sub-sampling circuit and the buffer in order to impart the relevant first binary value to all pixels in the case of a raster portion comprising nxm binary pixels of which at least a predetermined number j has a first binary value.

14. An image processing system which comprises at least two series-connected image processing devices as claimed in claims 1, 4, 5, 7, or 8.

* * * * *